Oct. 19, 1965          L. HÄKKÄ          3,212,549
ANTI-SKID MEANS FOR A VEHICLE AND THE LIKE
Filed March 1, 1963
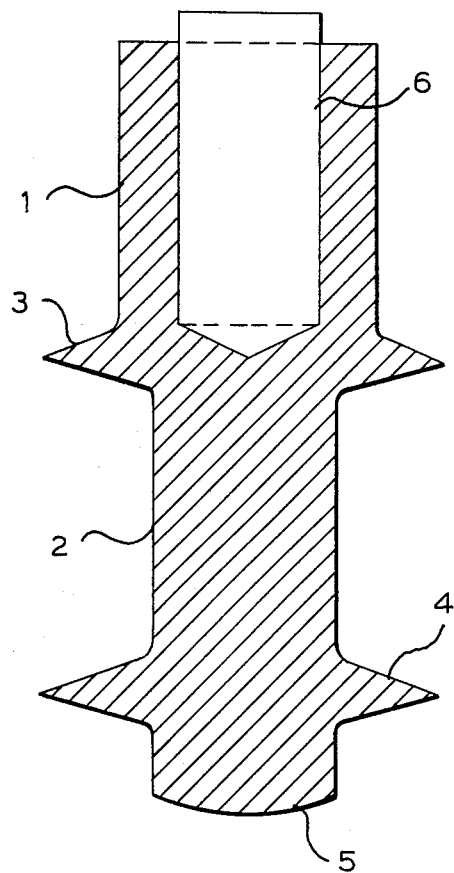
INVENTOR:
Lennart Häkkä
BY
Richards y Geier
ATTORNEYS United States Patent Office 3,212,549
Patented Oct. 19, 1965

3,212,549
ANTI-SKID MEANS FOR A VEHICLE
AND THE LIKE
Lennart Häkkä, Helsinki, Finland, assignor to Kovametalli Oy, Helsinki, Finland, a corporation of Finland
Filed Mar. 1, 1963, Ser. No. 262,066
2 Claims. (Cl. 152—210)

This invention relates to an anti-skid means provided with enlargements and adapted to be disposed into a hole made in the tire tread or into the tire tread during a manufacturing step thereof, said means being preferably provided with a very wear-resistant head or tip-piece. Prior art means of the stated kind usually have a base enlargement only, or two enlargements located close to the base. It has been observed that such prior art anti-skid means do stay in their positions but that they tilt in the tire when the vehicle is being driven. Tilting causes the anti-skid-means-end protruding from the tread to wear out from the one side thereof to such an extent that the wear-resistant tip-piece, e.g., a hard-metal piece disposed into the said means, is without support from a part on its side. The result is that the brittle and hard tip-piece will break off and the means will have lost its power.

The instant invention has for its object to provide an anti-skid means which will not tilt in the tire to any degree worth mentioning when the vehicle is being driven. The novel feature of the invention resides in an anti-skid means that is provided with at least a first enlargement located at the middle of the means or forward towards the tip of the means and at least a second enlargement located on the opposite side of the middle of the means. Preferably, the anti-skid means has at least one enlargement located near that end or at that end of the means adapted to be disposed into the tread and at least one enlargement located from the middle of the said means toward the tip. The enlargements are preferably flanges encircling the anti-skid means. In some instances, it is advantageous that the flanges decrease in thickness on moving from the anti-skid means toward the flange edge. Then, the meeting surfaces of the flange will form therebetween an angle preferably about 30°. The invention will now be described more in detail with reference to the embodiment shown in the accompanying drawing. In the drawing is shown a longitudinal sectional view of the anti-skid means of the invention.

The anti-skid means is composed of a peg-like body having a thicker fore-port 1 and a narrower rear-part 2. The fore-part 1 terminates slightly before the middle part of the anti-skid means. Within the fore-part 1 is disposed a hard-metal tip-piece 6 adapted to extend approximately to the juncture of the fore-part and the rear-part. At the juncture of the fore-part 1 and the rear-part 2 is located the body encircling flange 3. The juncture of the said flange and the body is curved. In thickness, the flange 3 decreases evenly from the body towards the flange edge so that the meeting surfaces of the flange form therebetween an angle of about 30°.

The rear-part 2 of the anti-skid means is provided with an encircling flange 4 located near the terminal end 5 of the rear-part 2, said end being convex. The flange 4 on the rear-part 2 corresponds to the flange 3 on the fore-part and the edges of the two flanges are just as far from the axis of the body.

When the anti-skid means of the invention has the enlargements on both sides of its middle, it follows that the anti-skid means cannot tilt in the tire tread as before when the vehicle is being driven. This being the case, the tip-end of the anti-skid means will not wear out from one of its sides at least to the extent that the sides of the hard-metal tip-part will not be protected by the body portion of the anti-skid means. Thus the tip-piece will not break off as easily as before. From the fact that the anti-skid means will not tilt to any extent worth mentioning follows the advantage that said means will bite into the road better than before and thus it will, more efficiently than before, prevent the vehicle from slipping. Also, as a result of the invention, the anti-skid means can be made thinner than before and consequently lighter in weight than before, which is also an advantage.

It is to be understood that the invention is not limited to the above described embodiment for the same can be modified in many different ways within the scope and spirit of the invention.

What is claimed is:
1. An anti-skid device for insertion into a tire tread, said device comprising a cylindrical body having an outer end and an inner end, a wear resistant tip-piece located in a hole formed in the outer end of said body, said tip-piece projecting beyond said body and being adapted to project beyond the tire tread, an annular flange integral with said body and located substantially in the middle thereof, said body having a smooth outer cylindrical surface devoid of flanges between said flange and the outer end of said body, said flange fitting inside the tire, and another annular flange integral with said body and independent of the first-mentioned flange, said other flange being axially spaced at a substantial distance from the first-mentioned flange and being located substantially adjacent the inner end thereof, said other flange fitting inside the tire adjacent the interior thereof.
2. An anti-skid device in accordance with claim 1, wherein the portion of the cylindrical body extending between the first-mentioned flange and the outer end of the body extending between the first-mentioned flange and the outer end of the body has a larger diameter than that of the portion of the cylindrical body extending between the first-mentioned flange and the inner end of the body.

References Cited by the Examiner
UNITED STATES PATENTS

| | | | |
|---|---|---|---|
| 1,017,732 | 2/12 | Blaisdell | 152—210 |
| 2,652,876 | 9/53 | Eisner | 152—210 |
| 3,124,191 | 3/64 | Forslund | 152—210 |

FOREIGN PATENTS

| | | |
|---|---|---|
| 3,219 | 1910 | Great Britain. |
| 30,680 | 5/60 | Finland. |
| 1,256,285 | 5/60 | France. |

ARTHUR L. LA POINT, *Primary Examiner.*